United States Patent
Houdeau

(10) Patent No.: US 6,535,262 B2
(45) Date of Patent: Mar. 18, 2003

(54) DISPLAY UNIT FOR CHIP CARDS WITH FOLDED SHEET A METHOD FOR MANUFACTURING SUCH A DISPLAY UNIT

(75) Inventor: Detlef Houdeau, Langquaid (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/078,145

(22) Filed: Feb. 19, 2002

(65) Prior Publication Data

US 2002/0097352 A1 Jul. 25, 2002

Related U.S. Application Data

(63) Continuation of application No. PCT/DE00/02812, filed on Aug. 18, 2000.

(30) Foreign Application Priority Data

Aug. 18, 1999 (DE) .......................... 199 39 106

(51) Int. Cl.⁷ .............................................. G02F 1/1333
(52) U.S. Cl. ....................... 349/150; 349/160; 349/151
(58) Field of Search ................................. 349/151, 160, 349/150

(56) References Cited

U.S. PATENT DOCUMENTS

| | | | |
|---|---|---|---|
| 4,104,728 A | | 8/1978 | Kasubuchi |
| 4,474,432 A | * | 10/1984 | Takamatsu et al. ..... 350/339 R |
| 4,862,153 A | | 8/1989 | Nakatami et al. |
| 5,436,744 A | | 7/1995 | Arledge et al. |
| 5,745,202 A | * | 4/1998 | Yamauchi et al. .......... 349/110 |
| 6,025,901 A | * | 2/2000 | Adachi et al. ............... 349/151 |

FOREIGN PATENT DOCUMENTS

| | | |
|---|---|---|
| DE | 2 350 176 | 4/1974 |
| DE | 24 27 335 | 1/1975 |
| DE | 31 05 981 | 11/1981 |
| DE | 196 04 374 A1 | 8/1997 |
| EP | 0 831 420 A2 | 3/1998 |
| EP | 0 940 771 A1 | 9/1999 |
| WO | WO 99/31646 | 6/1999 |

OTHER PUBLICATIONS

Minowa, T. et al.: "A New Construction Approach to Liquid Crystal Display Instrument for Automobiles", Warrendale, 1982, pp. 47–50.

* cited by examiner

Primary Examiner—Toan Ton
Assistant Examiner—Andrew Schechter
(74) Attorney, Agent, or Firm—Laurence A. Greenberg; Werner H. Stemer; Ralph E. Locher

(57) ABSTRACT

A display unit includes activation or driver electronics disposed on the rear side of a display element. A display unit has a front region with a display element; a rear region, facing away from the front region, with at least one control element for the activation of the at least one display element; and electrical lines for the connection of the at least one display element to the at least one control element. Preferably, an LCD display with a top layer, a liquid crystal layer, and a bottom sheet is used. The control element is disposed on the bottom sheet. The control element is, for example, an unpackaged IC, that is attached to the bottom sheet folded back on itself and is laterally offset in such a way that it cannot overheat the actual LCD display. The electrical lines are preferably conductor tracks on the bottom sheet.

4 Claims, 3 Drawing Sheets

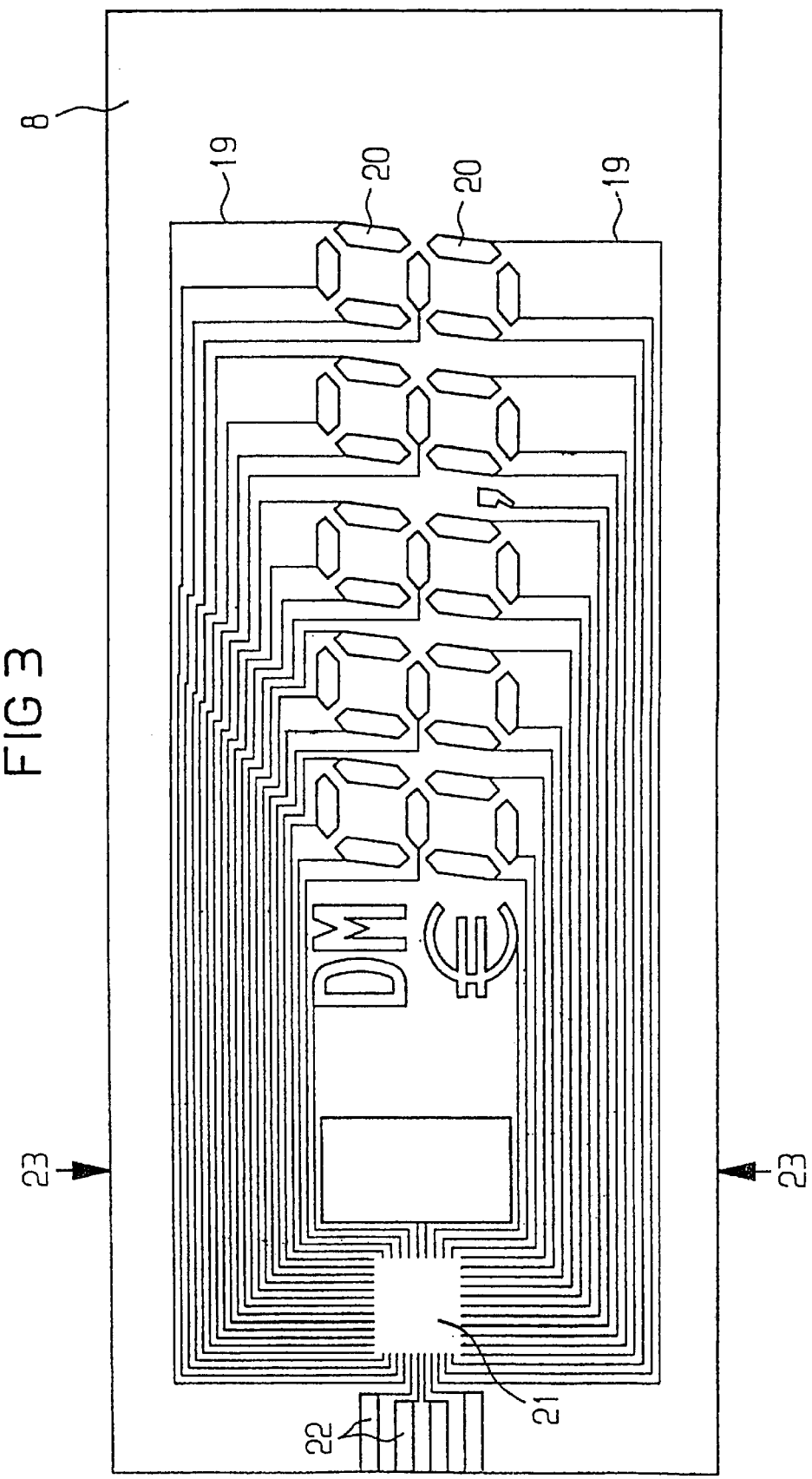

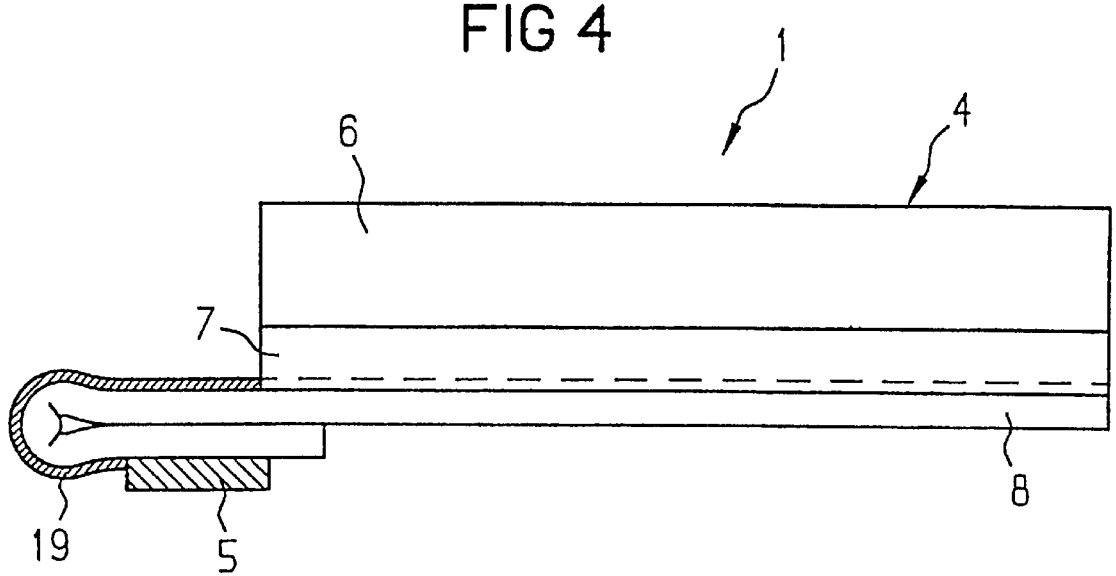
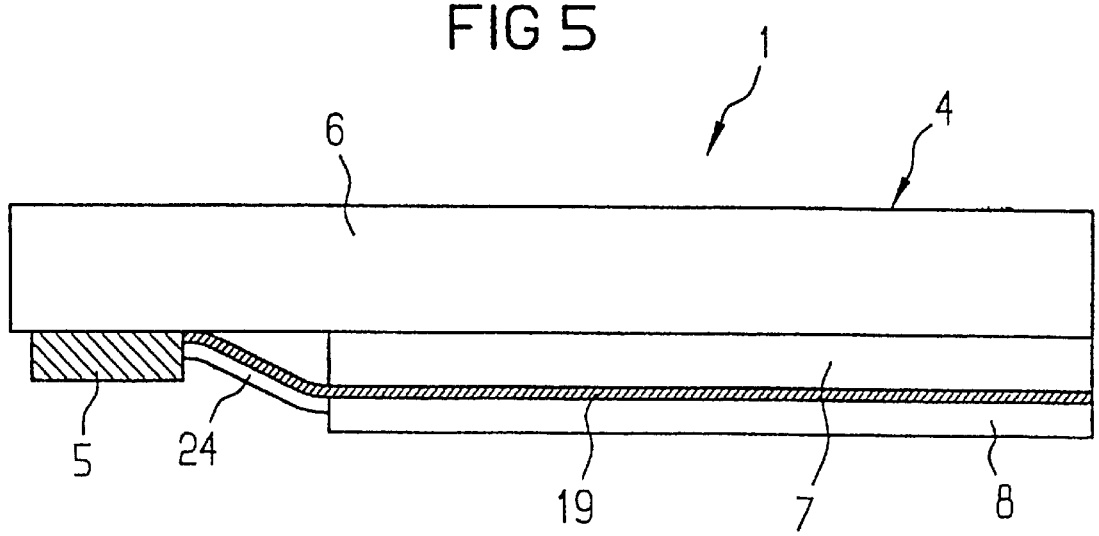

DISPLAY UNIT FOR CHIP CARDS WITH FOLDED SHEET A METHOD FOR MANUFACTURING SUCH A DISPLAY UNIT

CROSS-REFERENCE TO RELATED APPLICATION

This application is a continuation of copending International Application No. PCT/DE00/02812, filed Aug. 18, 2000, which designated the United States.

BACKGROUND OF THE INVENTION

FIELD OF THE INVENTION

The invention relates to a display unit in which the activation or driver electronics are disposed on the rear side of a display element.

Flat displays based on LED or LCD technology are increasingly being used in the area of data processing equipment or communication and entertainment electronics. In the process, LCD (liquid crystal diode) technologies are especially becoming widely accepted, on the basis of their contrast, low necessary current and favorable production costs. A customary LCD display in this case includes a top plate that covers the actual liquid crystal element with the liquid crystals and a bottom plate on which the liquid crystal element with the actual liquid crystals is mounted. This sandwich method achieves good protection for the sensitive liquid crystals.

For the electrical activation of the individual liquid crystals, the bottom plate is made larger than the actual liquid crystal, to allow contacts for leading away signal lines to be attached to it. It is customary to use what is known as a flex circuit, that is to say a flat ribbon cable with numerous individual signal lines, to allow the signals to be led to the bottom plate. The actual activation or driver electronics is/are consequently separate from the display unit.

It has also been proposed to dispose the control electronics directly on the protruding part of the bottom plate or bottom glass sheet. Both configurations, known in the prior art, have the disadvantage, however, that the bottom plate must be significantly larger than the actual display area, to allow the flat ribbon cable or the activation electronics to be fastened on it.

Integration of displays, such as LCD displays, in what are known as chip cards has so far not been possible at all on account of the confined lateral space, but in particular on account of the small thickness of chip cards of only at most 0.84 mm (according to ISO 7816, 10373). However, on account of the growing significance of chip cards and the increasing functionality accommodated on them, it would be advantageous also to provide a display capability on chip cards. This applies in particular when a capability of recharging with data or a monetary value is to be used for the purpose of repeated usability.

In the case of customary displays, moreover, the separation of the actual display area and the control electronics involves additional expenditure and further possible sources of faults. It would therefore be advantageous to have a display unit that is more compact, involves lower expenditure to produce and assemble and could possibly be included in chip cards.

SUMMARY OF THE INVENTION

It is accordingly an object of the invention to provide a display unit and a method for manufacturing a display unit that overcome the hereinafore-mentioned disadvantages of the heretofore-known devices and methods of this general type.

With the foregoing and other objects in view, there is provided, in accordance with the invention, a display unit for chip cards. The display unit includes a display element having a front side, a rear side, and a liquid crystal layer for the front side of the display unit. The display unit also includes a control element being electrically connected to the display element and disposed as an integrated circuit on the rear side of the display unit opposite from the front side.

With the objects of the invention in view, there is also provided a method of producing an LCD display element for chip cards. The first step of the method is providing a display element having a liquid crystal layer. The next step is providing a control element. The next step is providing a bottom sheet with a side having conductor tracks and a region extending beyond the liquid crystal layer. The next step is attaching the display element on the side of the bottom sheet. The next step is attaching the control element on the side of the bottom sheet in the region extending beyond the liquid crystal layer. The next step is folding the bottom sheet between the display element and the control element to form an edge on the bottom sheet, a face facing toward the liquid crystal layer, and a face facing away from the liquid crystal layer that holds the control element. The next step is leading the conductor tracks around the edge of the bottom sheet.

In one aspect, the invention is directed at a display unit in which a control element is positioned directly behind a display element.

In a further aspect, the invention is directed at a display unit of which the base area corresponds substantially to the base area of the liquid crystal.

In another aspect, the invention is directed at a display unit in which it has been possible for fault-prone plug-in connections largely to be minimized.

Accordingly, the invention is directed at a display unit with a front region with at least one display element, a rear region facing away from the front region, with at least one control element for the activation of the at least one display element and electrical lines for the connection of the at least one display element to the at least one control element.

A control element is to be understood here as meaning any electronic device that is capable of making the respectively used display elements display informational contents. For example, the control element may have a driver circuit or a number of circuits that convert the signals coming from an information-representing device into electric currents suitable for the display element.

The control element may in this case be disposed directly on the rear region or be encapsulated by a package. The package improves the control element stability with respect to external influences. A display element for the purposes of the present invention is understood here as meaning any substantially flat element that is suitable for the display of information, for example multi-element LED display modules, multi-element LCD display modules, which are suitable for the representation of numeric or alphanumeric information, matrix-based LED, LCD or plasma screens, mechanically displaying elements, etc. In this case, one or a number of the display elements respectively used may actually be used, for example a number of LED modules, which are respectively suitable for the display of a figure or a letter.

It is particularly preferred for the display element to have an LCD display. A display element that includes different types of individual elements is also conceivable.

When an LCD display is used, it is preferred for it to have a top layer, a liquid crystal layer, a bottom sheet, and for at least one control element to be disposed on the bottom sheet. The configuration of the control element on the bottom sheet may take place by techniques familiar to a person skilled in the art, for example by adhesive attachment, solder, fixing by common frame, etc. The top layer may, in the way already customary in the case of today's LCD displays, include glass. It may, however, also include a plastic sheet to reduce the thickness of the LCD display and increase the mechanical flexibility, as is necessary for example for use in chip cards. To avoid the absorption of moisture, the plastic sheet may be additionally provided with at least one water-vapor barrier layer.

Also, when other display elements are used as an LCD display, it is preferred for the control element to be disposed directly on the rear side of the at least one display element. In this case, the display element also may have a bottom sheet or bottom plate, which forms its rear side, it then being possible for the control element to be fastened to the bottom sheet or to the bottom plate.

The control element may have a package with a socket. The socket may be connected directly to the bottom sheet or bottom plate. In the case of driver circuits, which have a higher power demand, and as a result greater heat dissipation, this configuration improves cooling. Moreover, it is possible to comply exactly with specifications with respect to the desired depth of a display unit by using socket adapters. When included in chip cards, a socket would increase the thickness of the unit, possibly making it impossible for it to be included. Socketed packages are therefore not preferred when the display units according to the invention are used in chip cards.

The use of packages and sockets is prevented when the displays according to the invention are used in chip cards, because the latter are too thin to be able to accommodate control elements with packages. Therefore, it is preferred as an alternative for the control element to be an integrated circuit without a package, which is connected directly to the bottom sheet or bottom plate. The mounting of the integrated circuit usually takes place by conductive adhesion. Before the integrated circuit is mounted onto the bottom sheet or bottom plate, the integrated circuit forming the control element is thinned on its underside, to fit into a chip card, preferably to a thickness in the range of 0.1 mm to 0.2 mm.

The different improvements including a top sheet of plastic, a thin bottom sheet, and a thinned-back integrated circuit allow a thickness of the display unit of 0.55 mm in the region of the integrated circuit and 0.45 mm in other regions of a correspondingly constructed LCD display to be achieved.

In a particularly preferred embodiment of the present invention, the bottom sheet may be made larger in one dimension than the front region, that region of the bottom sheet that is larger than the front region may be folded back on itself, and the integrated circuit without a package may be connected to the folded-back region of the bottom sheet. To one side, the bottom sheet is consequently larger than it necessarily should be, to accommodate the display element. The bottom sheet is consequently constructed such that it can accommodate both the display elements and the integrated circuit and is flexible enough to be folded back. The folding back may take place directly onto the bottom sheet itself, so that the rear side of the bottom sheet is in contact with itself, but it may also be performed around a further supporting layer, the bottom sheet then having to be led around the edge of the supporting layer.

This configuration allows a particularly thin construction to be produced in a simple way, since, for example, conductor tracks only have to be provided on one side of the bottom sheet to allow the display element(s) and the integrated circuit to be electrically bonded simultaneously. A further advantage of this invention is that one side of the bottom film may be specifically constructed for the attachment of the components, while the other side has, for example, adhesive properties.

In a further preferred embodiment of the invention, the display element and the at least one control element are disposed on the opposite surfaces of a substantially planar supporting structure. Such a supporting structure is appropriate in particular whenever a number of display elements not initially connected to one another are to be used, or the rear side of the display element used is not very suitable in respect of its surface structure for allowing a connection to the at least one control element. The supporting structure consequently represents a common base on which both the display element and the control element can be optimally disposed. In most cases, such a supporting structure will favorably be a printed circuit board, preferably a flexible printed circuit board that can serve at the same time for the electrical signal transmission.

Electrical connection of the at least one display element and the at least one control element by way of the electrical lines may be performed in a variety of ways. For instance, the electrical lines may be led directly through the supporting structure.

Alternatively or simultaneously, the electrical lines may also be led around the edge of the supporting structure of the bottom plate or bottom sheet.

The bottom sheet may preferably be made larger in one dimension than the front region, that region of the bottom sheet that is larger than the front region may be folded back on itself, and the electrical lines may connect the front region of the bottom sheet to the folded-back region of the bottom sheet. This configuration is preferably combined with that described above, in which an integrated circuit is applied directly to the folded-back region of the bottom sheet.

If a surface suitable for the purpose, for example a folded-back bottom sheet, is available, the electrical lines may be led out as conductor tracks. This is appropriate in particular when a folded-back bottom sheet is used.

The electrical lines may likewise be configured as a flexible flat ribbon or as foil conductors, for example in the form of an inlay sheet.

The various types of electrical lines that can be used according to the invention can be combined with one another as desired, according to the electrical or spatial requirements, to allow optimum routing of the electrical lines to be achieved.

Specifically, when LCD display units are used, it is necessary to lead the electrical lines around the bottom sheet or bottom plate, since leading through the bottom plate, as is possible in the case of conventional printed circuit boards, is not possible here.

In some applications, for example again in the case of chip cards, it may cause thermal problems if heat is required when the integrated circuit is mounted or if the heat-producing integrated circuit is disposed directly behind the display elements, in particular in the case of the typically sensitive LCD displays. Therefore, in such cases, the integrated circuit is preferably disposed at a distance from the actual display element(s). This can be achieved by the control element being disposed in a region of the rear region of which the front region has no display element disposed on it. For example, it is possible to form on one side of the display unit, for example in the bottom plate or bottom sheet, an overhang, to the rear side of which the control element can be attached.

In an alternative embodiment, the electrical lines may also be direct connections between outputs of the at least one display element and outputs of the at least one control element. In the case of this particularly simple embodiment of the invention, the outputs of the various elements involved, that is to say the display elements and the control elements, are constructed in such a way that, when their two undersides are placed one on top of the other, they are directly opposed with their electrical outputs. This allows the outputs to be directly connected by way of electrical soldered joints. Consequently, in the case of this embodiment, no continuing conductor tracks or other electrical lines are necessary.

The display unit according to the invention may, furthermore, have a signal line bus for the connection of the at least one control element to a device that can or does display information on the display unit. Such a signal line bus is only used, however, for the transmission of the actual information signals, but not for the transmission of direct control lines for activating the individual segments of a display element. Consequently, considerably fewer lines are required than in the prior art.

The invention is finally also directed at the use of a display unit according to the invention for inclusion in compact devices, in which the lateral dimensions in the direction of the plane of the display are to correspond substantially to the size of the display unit.

The use may be characterized in that the inclusion takes place in chip cards. Suitable for performing inclusion is a cold adhering technique with cyanoacrylate. Cold adhering techniques with cyanoacrylate improves topography, does not subject the rear wall of the card to thermomechanical stresses, and also cannot cause thermally induced damage in the display unit.

The configuration according to the invention of the individual elements of the display unit leads to devices that are much more compact in plan view than was possible in the case of prior-art devices.

Other features which are considered as characteristic for the invention are set forth in the appended claims.

Although the invention is illustrated and described herein as embodied in a display unit and a method for manufacturing a display unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a plan view showing a bottom sheet intended for folding back;

FIG. 4 is a sectional view showing a further embodiment of the display unit, which uses the bottom sheet shown in FIG. 3 that has been folded; and FIG. 5 is a sectional view showing a further embodiment of the display unit with a control element that is attached directly to a rear region of the top sheet that is not in contact with the liquid crystal layer.

DESCRIPTION OF THE PREFERRED EMBODIMENTS

Figure 1:
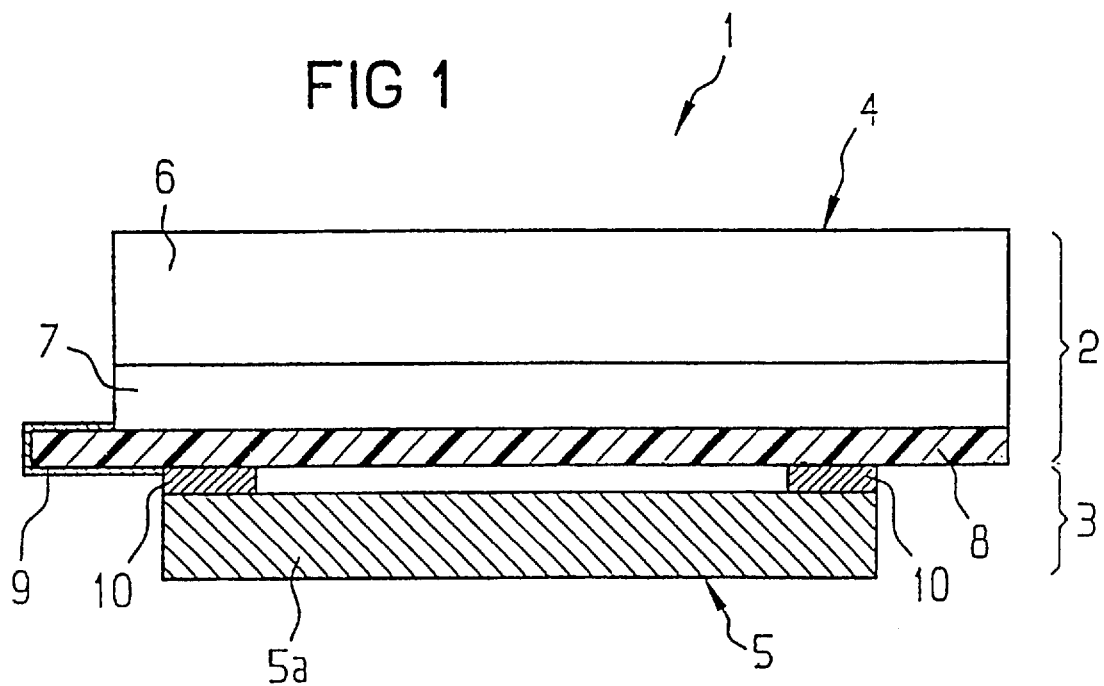
FIG. 1 is a diagrammatic, sectional view showing a first embodiment of a display unit with an LCD display, for example a matrix display.

Referring now to the figures of the drawings in detail and first, particularly to FIG. 1 thereof, there is shown a sectional view of a preferred embodiment of a display unit 1 of the present invention. The display unit 1 may in this case be divided into a front region 2 and a rear region 3. Here, the actual display element 4 may be a commercially available LCD display, which includes a top sheet 6, a liquid crystal layer 7, and a bottom sheet 8. Attached to the rear side of the display element 4 is the control element 5. In the present case, the control element 5 has a package 5a. The package 5a protects activation electronics contained in it against external influences or mechanical damage.

On one side of the package 5a, a wiring interposer 9 leads out of the package, is taken around the edge of the bottom sheet 8 and can activate the liquid crystal cells of the liquid crystal layer 7 with its signal lines. The routing provided by the wiring interposer 9 may take place by producing conductor tracks that lead around the edge, but also by foil-conductor cables or flat ribbon cables or by a bottom sheet with conductor tracks that is folded back on itself. In the exemplary embodiment shown in FIG. 1, the package 5a is kept at a distance from the bottom sheet 8 with the aid of nubbins 10. However, it is also conceivable for the package 5a to be adhesively attached or fastened in some other way directly onto the bottom sheet 8. Finally, it is also possible to dispense with the package 5a and adhesively attach or in some other way fasten the bare control electronics of the control element 5 directly onto the bottom sheet 8. The projecting edge of the bottom sheet 8 around which the wiring interposer 9 is led is to be thought of schematically, since smaller overhangs of the bottom sheet 8 are also possible in the case of certain embodiments of the invention and, on the other hand, the overhang might have to be larger if there is lateral displacement of the integrated circuit for thermal reasons. If available LCD displays are used, it must be assumed that such an overhang of the bottom sheet is present, since the flex circuit is usually provided there.

Figure 2:
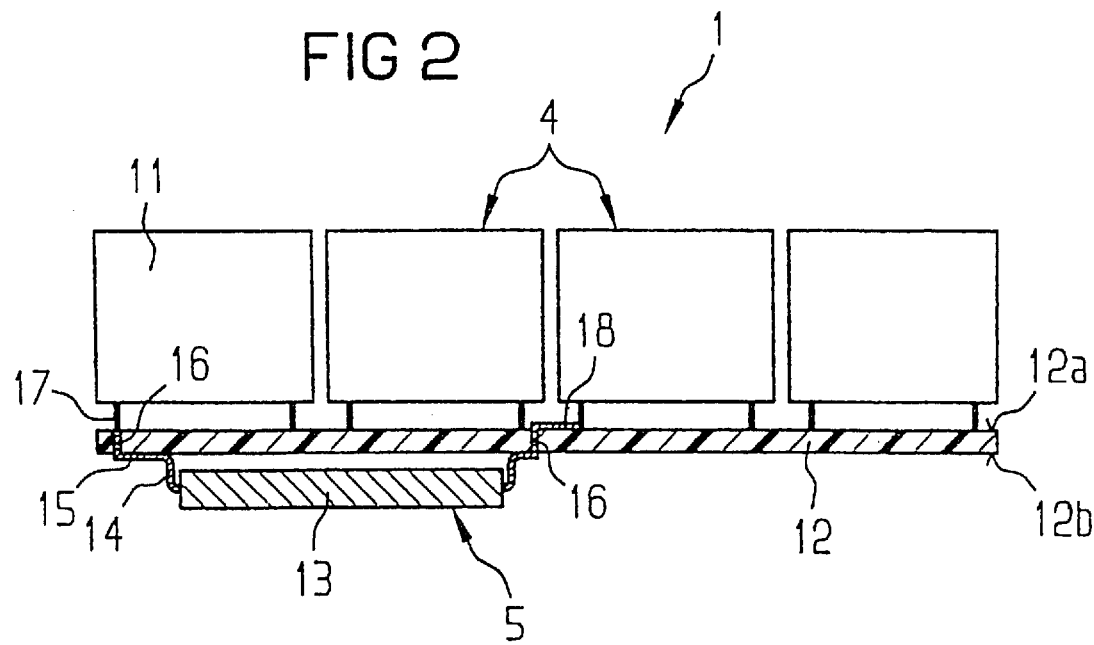
FIG. 2 is a sectional view showing a further preferred embodiment of the display unit of the present invention, in which a number of display elements, for example for figures and special symbols (i.e. the "euro" symbol), are disposed on a supporting printed circuit board.

FIG. 2 shows a sectional view of a further exemplary embodiment of the display unit of the present invention. Here, the individual elements used are disposed on the two sides 12a, 12b of a printed circuit board 12, which acts as a supporting structure. On the front side 12a of the printed circuit board 12, four display elements 4 are represented, in this case LED or LCD display modules 11, which are fastened to the printed circuit board 12 by their display module legs 17. The fastening of the elements 4, or 11, may also take place by adhesive or in some other way familiar to a person skilled in the art, for example in order to free the electrical connection via the display module legs 17 of mechanical pressure.

It is possible to dispense with the printed circuit board 12, or any supporting structure, if the individual display elements 4 are directly connected to one another in such a way that they form a unit.

Attached on the rear side 12b of the printed circuit board 12 is a control element 5 in the form of a driver circuit 13, from which there lead away IC legs 14, which serve for its electrical connection to external elements.

The left-hand region of FIG. 2 shows an IC leg 14, a conductor track 15, and a conductor leadthrough 16 through the printed circuit board 12 forming an electrical signal connection between the driver circuit 13 and the display module leg 17 of an LED or LCD display module 11.

In the middle region of FIG. 2 it is shown how, again on the basis of an IC leg 14, a conductor leadthrough 16 may be performed directly through the printed circuit board 12, a conductor track 18 then leading on the front side 12a of the printed circuit board 12 to the display module leg 17, in order to achieve the electrical connection between the driver circuit 13 and the display module 11.

FIG. 3 shows a bottom sheet 8 according to a particularly preferred embodiment of the present invention, which is intended for use in an LCD display element. Numerous conductor tracks 19, which serve for supplying power to liquid crystal electrodes 20, have been applied to the bottom sheet. These electrodes are usually made of a material such as indium oxide or zinc oxide, in order to be transparent and consequently not visible when the display unit is viewed. The conductor tracks 19 are brought together in a circuit contact region 21, in which the driver module or the control element 5 can be adhesively embedded. A number of conductor tracks 22, which serve for the external connection of the control element 5 to a device, lead from the circuit contact region 21. When the LCD display element is being assembled, the bottom sheet 8 is folded along the folding line 23—23 and folded back on itself, so that the control element 5 comes to lie on the rear side. The folding at the folding line 23 has the effect that the control element 5 comes to lie in a region of the bottom sheet 8 in which there are no liquid crystals.

FIG. 4 shows a cross section through a display unit 1 according to the invention that has been configured with the bottom sheet according to FIG. 3. The control element 5, for example a thinned-back integrated circuit, is disposed laterally from the side of the actual display element 4. The folding-back of the bottom sheet 8 results in the conductor tracks 19 being led around the newly formed edge of the bottom sheet 8.

FIG. 5 shows a further embodiment of the display unit of the present invention in cross section, with an LCD display being used. In the case of this display, the bottom sheet 6 is made larger than the liquid crystal layer 7. The control element 5 is not attached to the bottom sheet 8, but directly to a rear region of the top sheet 6 that is not in contact with the liquid crystal layer 7. The electrical connection between the bottom sheet 8, bearing conductor tracks 19, and the control element 5 takes place for example by a further sheet 24, covered with conductor tracks, or in some other suitable way. This embodiment has a particularly small thickness and is therefore particularly suitable for use in chip cards.

The present invention allows display elements to be made in much more compact dimensions than was previously possible. Embodiments of the invention feature electrical lines that are shorter and consequently freer from interference, and simplified signal information transmission between the display unit and the activating device. The overall construction of the unit remains in the conventional area, so that use in existing devices should be possible at any time. The routing of the wiring interposer over the sheet edges means additional wiring area is no longer necessary. The control element is located on the side that is more favorable for leading away electric signals into a device. Moreover, the control element is mechanically protected by the display elements against intervention and damage. Finally, the control system remains integrated in the display unit as a whole, so that the latter can be marketed as a functional block that contains display elements and control elements optimally made to match one another.

The construction according to the invention makes it possible for the first time to create LCD displays of a thickness that can be accommodated in chip cards.

I claim:

1. A display unit for chip cards, the display unit having a front side and a rear side, comprising;

a display element having a top sheet, a bottom sheet, and a liquid crystal layer provided as a display for the front side of the display unit;

a control element being electrically connected to said display element through said bottom sheet and disposed on the rear side of the display unit; and said bottom sheet including:
an upper side, said display element and said control element being fastened to said upper side; and
a fold being located between said display element and said control element and defining two opposing faces of said upper side, one of said opposing faces facing toward said liquid crystal layers the other of said opposing faces facing away from said liquid crystal layer;
said control element being disposed laterally from said display element and on said face facing away from said liquid crystal layer.

2. The display unit according to claim 1, including:

an edge on said bottom sheet; and electrical lines leading around said edge of said bottom sheet.

3. The display unit according to claim 1, wherein said control element is an integrated circuit without a package.

4. A method of producing an LCD display element for chip cards, which comprises:

providing a display element having a liquid crystal layer;

providing a control element;

providing a bottom sheet with a side having conductor tracks and a region extending beyond the liquid crystal layer;

attaching the display element on the side of the bottom sheet;

attaching the control element on the side of the bottom sheet in the region extending beyond the liquid crystal layer;

folding the bottom sheet between the display element and the control element to form on the bottom sheet an edge, a face facing toward the liquid crystal layer, and a face facing away from the liquid crystal layer holding the control element, which is disposed laterally from said display element; and leading the conductor tracks around the edge of the bottom sheet.

* * * * *